United States Patent
Lee

(10) Patent No.: US 9,307,022 B2
(45) Date of Patent: *Apr. 5, 2016

(54) APPARATUS AND METHOD FOR DETERMINING GROUP OWNER IN ESTABLISHMENT OF WI-FI DIRECT CONNECTION

(71) Applicant: Samsung Electronics Co., Ltd., Gyeonggi-do (KR)

(72) Inventor: Sung-Jin Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,176

(22) Filed: May 11, 2015

(65) Prior Publication Data

US 2015/0244793 A1 Aug. 27, 2015

Related U.S. Application Data

(63) Continuation of application No. 13/588,434, filed on Aug. 17, 2012, now Pat. No. 9,031,507.

(30) Foreign Application Priority Data

Aug. 18, 2011 (KR) ........................ 10-2011-0082090

(51) Int. Cl.
*H04W 4/08* (2009.01)
*H04W 84/20* (2009.01)
*H04W 4/20* (2009.01)
*H04L 29/08* (2006.01)
*H04W 4/00* (2009.01)

(52) U.S. Cl.
CPC ........ *H04L 67/1051* (2013.01); *H04L 67/1044* (2013.01); *H04W 4/008* (2013.01); *H04W 4/08* (2013.01); *H04W 4/203* (2013.01); *H04W 84/20* (2013.01)

(58) Field of Classification Search
None
See application file for complete search history.

(56) References Cited

U.S. PATENT DOCUMENTS

| 2008/0144575 | A1 | 6/2008 | Chen et al. |
|---|---|---|---|
| 2009/0088089 | A1 | 4/2009 | Chandra et al. |
| 2009/0170546 | A1 * | 7/2009 | Nishida ......................... 455/517 |

(Continued)

OTHER PUBLICATIONS

Wi-Fi Alliance Technical Committee P2P Task Group, Wi-Fi Peer-to-Peer (P2P) Technical Specification, Draft Version 1.14, 2010.

*Primary Examiner* — Lewis West
*Assistant Examiner* — Dong-Chang Shiue
(74) *Attorney, Agent, or Firm* — The Farrell Law Firm, P.C.

(57) ABSTRACT

A method and a first device for determining a group owner during establishment of a local-wireless communication connection are provided. The method includes searching for a second device that supports the local-wireless communication connection; searching, if the second device is found, for services supportable by the second device; determining an intent value of the first device corresponding to a group owner authority with respect to a service to be connected among the found supportable services; transmitting, to the second device, a negotiation message including the determined intent value of the first device; receiving, from the second device, a negotiation message including an intent value of the second device; and determining, from among the first device and the second device, a device having the group owner authority by comparing the determined intent value of the first device with the intent value of the second device.

17 Claims, 4 Drawing Sheets

(56) References Cited

U.S. PATENT DOCUMENTS

| | | | |
|---|---|---|---|
| 2011/0010246 A1* | 1/2011 | Kasslin et al. | 705/14.64 |
| 2011/0026504 A1* | 2/2011 | Feinberg | 370/338 |
| 2011/0093536 A1* | 4/2011 | Wentink | 709/204 |
| 2011/0149806 A1 | 6/2011 | Verma et al. | |
| 2011/0149816 A1* | 6/2011 | Saito et al. | 370/310 |
| 2011/0188391 A1 | 8/2011 | Sella et al. | |
| 2012/0320886 A1* | 12/2012 | Anders et al. | 370/338 |
| 2013/0045677 A1* | 2/2013 | Chien | 455/39 |

\* cited by examiner

APPARATUS AND METHOD FOR DETERMINING GROUP OWNER IN ESTABLISHMENT OF WI-FI DIRECT CONNECTION

PRIORITY

This application is a continuation application of U.S. patent application Ser. No. 13/588,434, which was filed in the U.S. Patent and Trademark Office on Aug. 17, 2012, now U.S. Pat. No. 9,031,507, which claims priority under 35 U.S.C. §119(a) to a Korean Patent Application filed in the Korean Intellectual Property Office on Aug. 18, 2011 and assigned Serial No. 10-2011-0082090, the entire contents of which are hereby incorporated by reference.

BACKGROUND OF THE INVENTION

1. Field of the Invention

The present invention generally relates to an apparatus and method for performing a service connection in a Wi-Fi Direct network, and more particularly, to an apparatus and method for determining a group owner in a service connection in a Wi-Fi Direct network.

2. Description of the Related Art

Wi-Fi Direct is a communication technique which allows devices to directly connect each other for data exchange without an Access Point (AP) beyond a conventional wireless LAN technique in which networking is made based on an AP. Herein, "Wi-Fi Direct" refers to devices and/or communications compatible with the WI-FI DIRECT™ communications protocols.

FIG. 1 is a diagram illustrating a Wi-Fi Direct network between devices.

Referring to FIG. 1, a basic Wi-Fi Direct connection scheme performs a one-to-one connection between devices 110 and 120, thus forming a Wi-Fi Direct network 100. For example, the pair of devices 110 and 120 may be, for example, two smart phones, a notebook and a mouse, and a tablet Personal Computer (PC) and a printer, etc. directly connected to each other through Wi-Fi Direct, thus establishing an Internet connection or forming a network. In addition, a device may form a network with one or more devices in the vicinity of the device, such as a digital camera, an Motion Picture Experts' Group Audio Layer 3 (MP3) player, a game console, a TV, etc. Consequently, various forms of communications and transfers are enabled. For example, a picture, a music file, or a moving image contained in a smart phone may be easily transmitted to another smart phone, a document and a picture stored in a tablet PC may be directly printed, contact information of a PC and contact information of a smart phone may be synchronized with each other, and game consoles may be directly connected to be used for playing a game.

Based on the Wi-Fi Direct scheme, devices may be connected according to the following process. Referring to FIG. 1, a first device 110 searches for a device supporting Wi-Fi Direct in the vicinity thereof and finds a second device 120. The first device 110 determines whether the second device 120 supports a service desired by the first device 110, thus checking connection intention. If a desired service and a provided service are matched, the first device 110 determines connection intention with the second device 120 and negotiates with the second device 120 regarding which one of the first device 110 and the second device 120 is to serve as an owner (or a soft Access Point (AP)). The two devices 110 and 120 exchange their intent values to determine whether to serve as an owner. The two devices 110 and 120 determine which one of the devices 110 and 120 is to serve as an owner through the foregoing procedure, and then the determined device starts operating as the owner and functioning as the soft AP.

As such, since the Wi-Fi Direct scheme is a direct connection scheme in which one of devices serves as a soft AP without a separate physical AP, one of two or more devices forming a Wi-Fi Direct network group must operate as a group owner that has control over other devices and serves as a soft AP.

As described above, among devices that form a Wi-Fi Direct network to execute a service, a device is designated as a group owner. If a device is a mobile communication terminal, for Wi-Fi Direct connection between the mobile communication terminal and another terminal of the same type, it does not matter which one of the two mobile communication terminals is designated as a group owner and there is no difference in performance.

However, as shown in FIG. 1, the first device 110, which is a mobile communication terminal, may be connected with the second device 120, which is a computer. In other words, the mobile communication terminal may have to be connected with a high-performance device that has superior performance over the mobile communication terminal and is constantly provided with power. In this case, it is preferable that the second device 120 that is the high-performance device operates as a group owner and the first device 110 executes a general client function.

Although one of devices operates as a group owner while establishing the Wi-Fi Direct connection, there currently is no way to designate a group owner, such that designation of a device suitable for a particular situation or condition, such as a service type, among the devices is guaranteed. As such, in execution of a Wi-Fi Direct connection procedure, a group owner cannot be designated according to a type of a service to be connected, resulting in inefficient group management.

SUMMARY OF THE INVENTION

Accordingly, an aspect of the present invention is to provide an apparatus and method for efficiently designating a group owner when a Wi-Fi Direct network group is formed between devices.

Another aspect of the present invention is to provide an apparatus and method for designating a group owner based on a type of a service when a Wi-Fi Direct network group is formed between devices.

According to an aspect of the present invention, there is provided a method for determining a group owner during establishment of a local-wireless communication connection performed by a first device. The method includes searching for a second device that supports the local-wireless communication connection; searching, if the second device is found, for services supportable by the second device; determining an intent value of the first device corresponding to a group owner authority with respect to a service to be connected among the found supportable services; transmitting, to the second device, a negotiation message including the determined intent value of the first device; receiving, from the second device, a negotiation message including an intent value of the second device; and determining, from among the first device and the second device, a device having the group owner authority by comparing the determined intent value of the first device with the intent value of the second device.

According to another aspect of the present invention, there is provided a first device for determining a group owner during establishment of a local-wireless communication connection. The first device includes a local-wireless communication connecting unit for searching for a second device that supports the local-wireless communication connection and searching for services supportable by the second device, if the second device is found; and a controller for determining an intent value of the first device corresponding to a group owner authority with respect to a service to be connected among the found supportable services, transmitting, to the second device, a negotiation message including the determined intent value of the first device, and receiving, from the second device, a negotiation message including an intent value of the second device, and determining, form among the first device and the second device, a device having the group owner authority by comparing the determined intent value of the first device with the intent value of the second device.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF EMBODIMENTS OF THE PRESENT INVENTION

Figure 1:
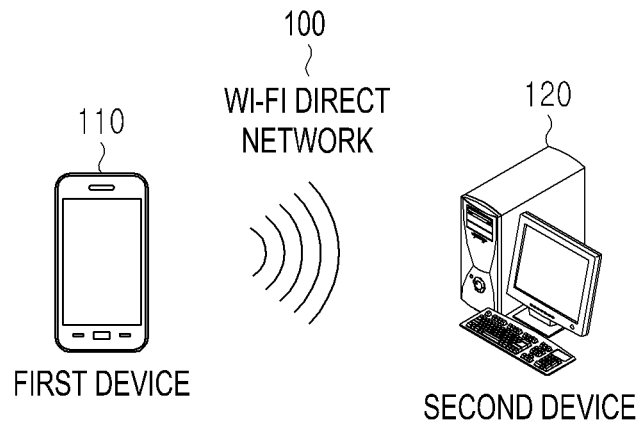
FIG. 1 is a diagram illustrating a Wi-Fi Direct network between general devices.

Hereinafter, embodiments of the present invention are described in detail with reference to the accompanying drawings. It should be noted that throughout the drawings, identical components may be referred to by identical reference numerals. The detailed descriptions of functions and configurations incorporated herein that are well known to those skilled in the art may be omitted to avoid unnecessarily obscuring the present invention.

The following detailed description corresponds to representative embodiments of the present invention for. For convenience, names of entities defined in Wi-Fi Direct or Wi-Fi P2P will be used, but such standards and names do not limit the scope of the present invention and the present invention may also be applied to any system having a similar technical background.

According to an embodiment of the present invention, a method for designating a group owner among devices forming a local-wireless communication (e.g. Wi-Fi Direct) network is provided. To this end, a method according to an embodiment of the present invention may include, once a device finds a target device which is to be Wi-Fi Direct connected in a Wi-Fi Direct based network, searching for an intent value regarding a group owner, which corresponds to a service to be connected with the target device, by referring to a table which stores intent values with respect to services, and exchanging negotiation messages including the found intent values for the group owner with the target device and then designating the group owner by comparing the exchanged intent values. Through this method, the group owner can be designated according to the service to be connected.

Operations and components of a device having the foregoing function implemented therein are described as follows with reference to FIG. 2.

Figure 2:
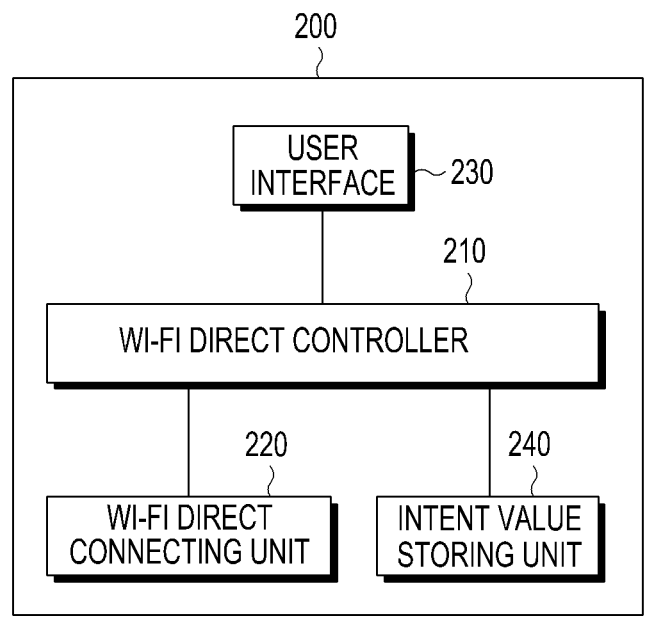
FIG. 2 is an internal block diagram illustrating a device that establishes Wi-Fi Direct connection according to an embodiment of the present invention.

FIG. 2 is an internal block diagram illustrating a device that establishes Wi-Fi Direct connection according to an embodiment of the present invention.

Referring to FIG. 2, a device 200 includes a Wi-Fi Direct controller 210, a Wi-Fi Direct connecting unit 220, a user interface 230, and an intent value storing unit 240. Herein, the device 200 may be any device that supports Wi-Fi Direct, such as a smart phone, a cellular phone, a digital camera, an MP3 player, a game console, a TV, a display device, a printer, a beam projector, a vehicle head unit, etc.

The Wi-Fi Direct connecting unit 220 searches for a nearby device and searches for a supportable service.

The user interface 230 is an input means for receiving a selection of a desired service among found services from a user.

The intent value storing unit 240 stores a table in which an intent value regarding a group owner is mapped to each of at least one service. An intent value indicating authority of a group owner (or lack thereof) according to an embodiment of the present invention may be set differently according to types of services, and may be changed by a user through the user interface 230.

The Wi-Fi Direct controller 210, after searching for a partner device that can provide a desired service through a service discovery, performs a group owner negotiation. In the service discovery state, devices exchange negotiation messages with each other and intent values included in the negotiation messages are compared, such that a device having transmitted a larger intent value is designated as a group owner.

More specifically, after the service discovery is performed, the Wi-Fi Direct controller 210 determines an intent value corresponding to a service to be connected among found services by referring to the table stored in the intent value storing unit 240, generates a negotiation request message including the determined intent value, and transmits the generated negotiation request message to the found device. The Wi-Fi Direct controller 210 receives a negotiation request message including an intent value of the found device in response to the negotiation request message and compares the intent values of the two devices. Based on a result of the comparison, the device having the larger intent value is designated as a group owner. If the device 200 is designated as the group owner, the found device operates as a client.

A group owner designating process in establishing a Wi-Fi Direct connection between two devices is described with reference to FIG. 3.

Figure 3:
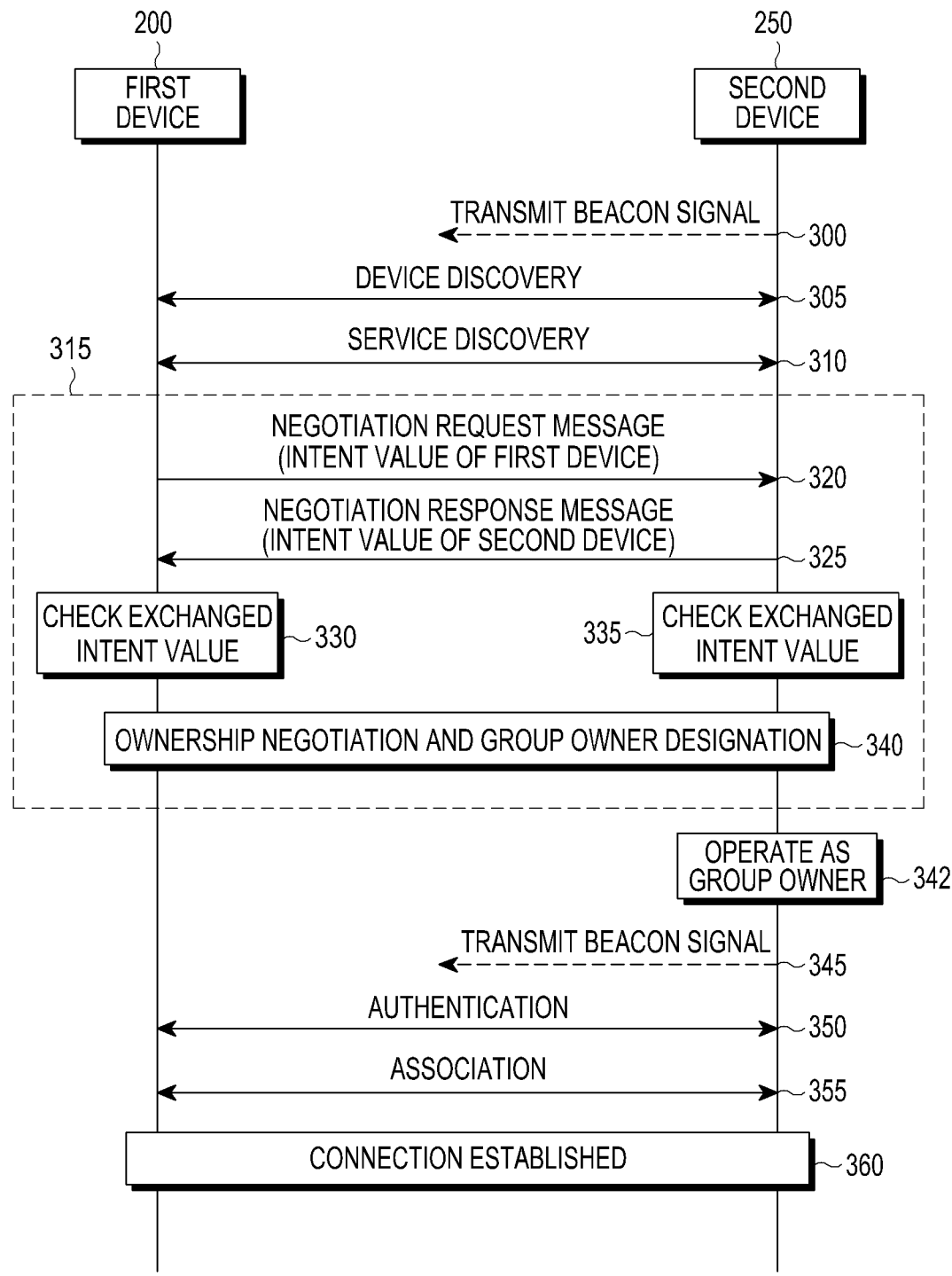
FIG. 3 is a signal flowchart illustrating a method for designating a group owner in establishment of Wi-Fi Direct connection between devices according to an embodiment of the present invention.

FIG. 3 is a signal flowchart illustrating a method for designating a group owner in establishment of Wi-Fi Direct connection between devices according to an embodiment of the present invention.

Referring to FIG. 3, the first device 200 and a second device 250 may form a Wi-Fi Direct network by establishing direct peer-to-peer (P2P) connection.

The first device 200 senses a beacon signal transmitted from the second device 250 in step 300, and finds the second device 250 through a device discovery procedure in step 305. In step 310, the first device 200 performs a service discovery procedure for searching for a supportable service. Through the service discovery procedure, the first device 200 searches for a user desired service supported by the second device 250. For example, the first device 200 may search for all services supported by the second device 250 or a particular service supported by the second device 250.

In accordance with embodiments of the present invention, various service discovery methods may be selectively used according to various techniques. The examples of service discovery described herein are non-limiting, and other forms of service discovery may be used in accordance with embodiments of the present invention. In the described examples herein, only a discovery results corresponding to services detected in both devices (i.e., both the first device 200 and the second device 250) are used for a convenience of description.

Figure 4:
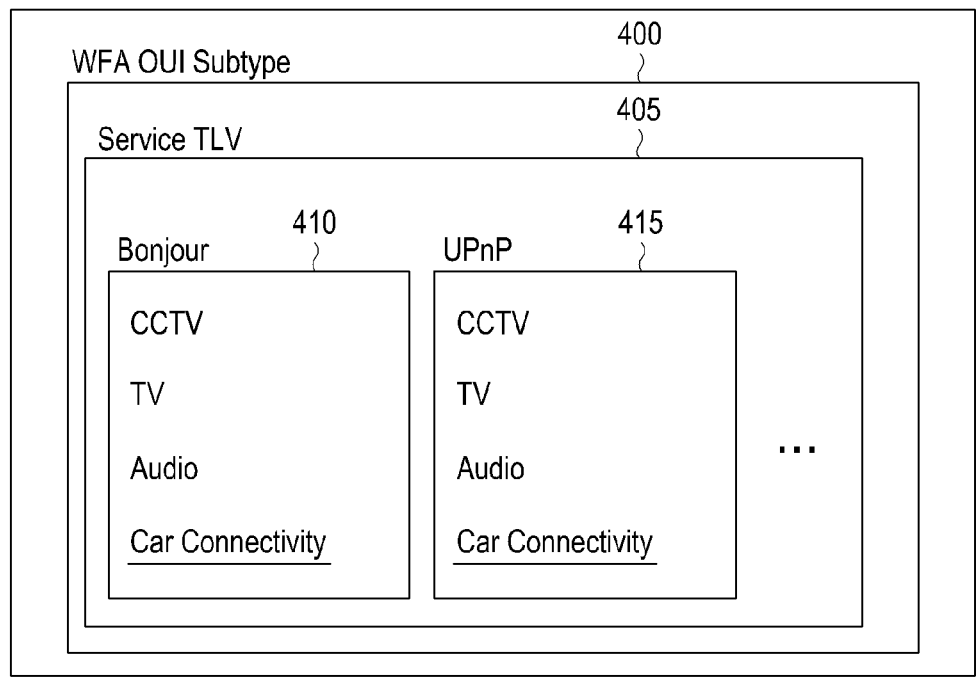
FIG. 4 is a structural diagram illustrating a service discovery message according to an embodiment of the present invention.

A discovery procedure in accordance with an embodiment of the present invention is described as follow with reference to FIG. 4.

FIG. 4 is a structural diagram illustrating a service discovery message according to an embodiment of the present invention.

Referring to FIG. 4, a format of a general service discovery message, which is formatted as a Generic Advertising Service (GAS) message format defined in Institute of Electronics and Electrical Engineers (IEEE) 802.11u, and Wi-Fi Alliance (WFA) Organizationally Unique Identifier (OUI) Subtype 400 is included in the GAS message to indicate a message type defined in the WFA specification. The WFA OUI Subtype 400 has a Service Type-Length-Value (TLV) field 405 therein, and the Service TLV field permits various service discovery methods. For example, various service discovery methods such as Bonjour 410 or Universal Plug and Play (UPnP) 415 may be used, but these methods are merely provided as examples, and other discovery methods may be used in accordance with embodiments of the present invention.

Respective service discovery methods deliver a type of a service they desire to support, including service types in various forms. In the example illustrated in FIG. 4, various services such as Convergent Connectivity Technology (CCT), TeleVision (TV), Audio, Car Connectivity, and so forth may be defined. In the present example according to an embodiment of the present invention, the Car Connectivity service is supported through the Bonjour or UPnP discovery techniques.

Referring back to FIG. 3, after a desired service is found through the service discovery procedure, a group owner negotiation procedure 315 is performed in as follows. The first device 200 determines an intent value regarding the authority of a group owner according to the found service. The first device 200 may determine the intent value by referring to a service-intent value mapping table. Next, the first device 200 generates a negotiation request message including the determined intent value of the first device 200. Then, the first device 200 delivers the negotiation request message, which includes the determined intent value of the first device 200, to the second device 250 in step 320. In response to the negotiation request message, the first device 200 receives a negotiation response message including an intent value of the second device 250 in step 325. On the other hand, if the second device 250 sends a negotiation request message including its intent value, the first device 200 may send a negotiation response message including the intent value of the first device 200, which is determined in the first device 200, to the second device 250. The first device 200 is not necessarily the entity that sends the negotiation request message, and negotiation messages are exchanged in order to check a partner's intent value.

The basic format of the negotiation message is based on a format shown in Table 1, as follows:

TABLE 1

| FIELD | SIZE (octets) | VALUE (Hexadecimal) | DESCRIPTION |
|---|---|---|---|
| Category | 1 | 0x04 | IEEE 802.11 public action usage. |
| Action Field | 1 | 0x09 | IEEE 802.11 vendor specific usage. |
| OUI | 3 | 00 50 F2 | WFA specific OUI. |
| OUI type | 1 | 0x09 (to be assigned) | Identifying the type or version of action frame. Setting to 09 indicates WFA P2P v 1.0. |
| OUI Subtype | 1 | | Identifying the type of P2P public action frame. The specific value is defined in Table 2. |
| Dialog Token | 1 | | Set to a nonzero value to indentify the request/response transaction. |
| Elements | variable | | Including P2P IE or any information elements defined in IEEE Std 802.11-2007 [1]. |

Referring to Table 2, 'OUI Subtype' of Table 1 expresses whether the message is a Group Owner (GO) negotiation request message, a GO negotiation response message, or a confirmation message.

TABLE 2

| TYPE | NOTES |
|---|---|
| 0 | Go Negotiation Request |
| 1 | Go Negotiation Response |
| 2 | Go Negotiation Confirmation |
| 3 | P2P Invitation Request |
| 4 | P2P Invitation Response |
| 5 | Device Discoverability Request |
| 6 | Device Discoverability Response |
| 7 | Provision Discovery Request |
| 8 | Provision Discovery Response |
| 9-255 | Reserved |

If the message is expressed as the GO negotiation request message in Table 2, the negotiation request message is configured with contents shown in Table 3. If the message is expressed as the GO negotiation response message in Table 2, the negotiation response message is configured with contents shown in Table 4.

TABLE 3

| ATTRIBUTES | ATTRIBUTE ID | NOTE |
|---|---|---|
| Status | 0 | The Status attribute shall only be present in the P2P IE if the Status Code being signaled is "Rejected by User". |
| P2P Capability | 2 | The P2P Capability attribute shall be present in the P2P IE. |
| Group Owner Intent | 4 | The Group Owner Intent attributes shall be present in the P2P IE. |
| Configuration Timeout | 5 | The Configuration Timeout attribute shall be present in the P2P IE. |
| Listen Channel | 6 | The Listen Channel attribute shall be present in the P2P IE. |
| Extended Listen Timing | 8 | The Extended Listen Timing attribute may be present in the P2P IE to advertise Listen State availability of the P2P Device sending the GO Negotiation Request. |
| Intended P2P Interface Address | 9 | The Intended P2P Interface Address attribute shall be present in the P2P IE. |
| Channel List | 11 | The Channel List attribute shall be present in the P2P IE. |

TABLE 3-continued

| ATTRIBUTES | ATTRIBUTE ID | NOTE |
|---|---|---|
| P2P Device Info | 13 | The P2P Device Information attribute shall be present in the P2P IE. |
| Operating Channel | 17 | The Operating Channel attribute shall be present in the P2P IE. |

In Table 3, in a 'Group Owner Intent' field, an intent value determined according to a service type in a device according to an embodiment of the present invention is set.

TABLE 4

| ATTRIBUTES | ATTRIBUTE ID | NOTE |
|---|---|---|
| Status | 0 | The Status attribute shall be present in the P2P IE. |
| P2P Capability | 2 | The P2P Capability attribute shall be present in the P2P IE. |
| Group Owner Intent | 4 | The Group Owner Intent attribute shall be present in the P2P IE. |
| Configuration Timeout | 5 | The Configuration Timeout attribute shall be present in the P2P IE. |
| Operating Channel | 17 | The Operating Channel attribute shall be present in the P2P IE. |
| Intended P2P Interface Address | 9 | The Intended P2P Interface Address attribute shall be present in the P2P IE. |
| Channel List | 11 | The Channel List attribute shall be present in the P2P IE. |
| P2P Device Info | 13 | The P2P Device Information attribute shall be present in the P2P IE. |

Like in Table 3, in Table 4, an intent value determined according to a type of a service in a device according to an embodiment of the present invention is set in a 'Group Owner Intent' field. If the first device 200 stores a mapping table stored by a user and the second device 250 does not have a mapping table, a default intent value may be set in the 'Group Owner Intent' field in the second device 250. The default value may be set at the time of device manufacturing, and may also be changed after manufacture for user convenience.

Upon exchanging the negotiation request message and the negotiation response message as shown in Table 3 and Table 4, the first device 200 and the second device 250 check intent values included in the negotiation request message and the negotiation response message, respectively, in steps 330 and 335. In step 340, ownership negotiation and group owner designation are performed between the first device 200 and the second device 250. More specifically, the first device 200 compares its intent value with the intent value received from the second device 250 to designate a device having a larger intent value as a group owner. If the second device 250 is designated as a group owner, the second device 250 starts operating as the group owner in step 342. That is, when the second device 250 is designated as a group owner, it operates as AP rather than as a client and performs group owner operations. Consequently, after transmitting a beacon signal in step 345, the second device 250 performs authentication with the first device 200 in step 350 and performs association with the first device 200 in step 355, thus establishing connection in step 360.

As described above, according to embodiments of the present invention, the authority of the group owner can be flexibly managed according to a service, such that an optimal device for executing a service to be connected can be designated as the group owner among devices forming a Wi-Fi Direct network.

To flexibly manage the authority of the group owner according to a service, an intent value regarding the group owner is mapped to each service for management using a table in advance.

Figure 5:
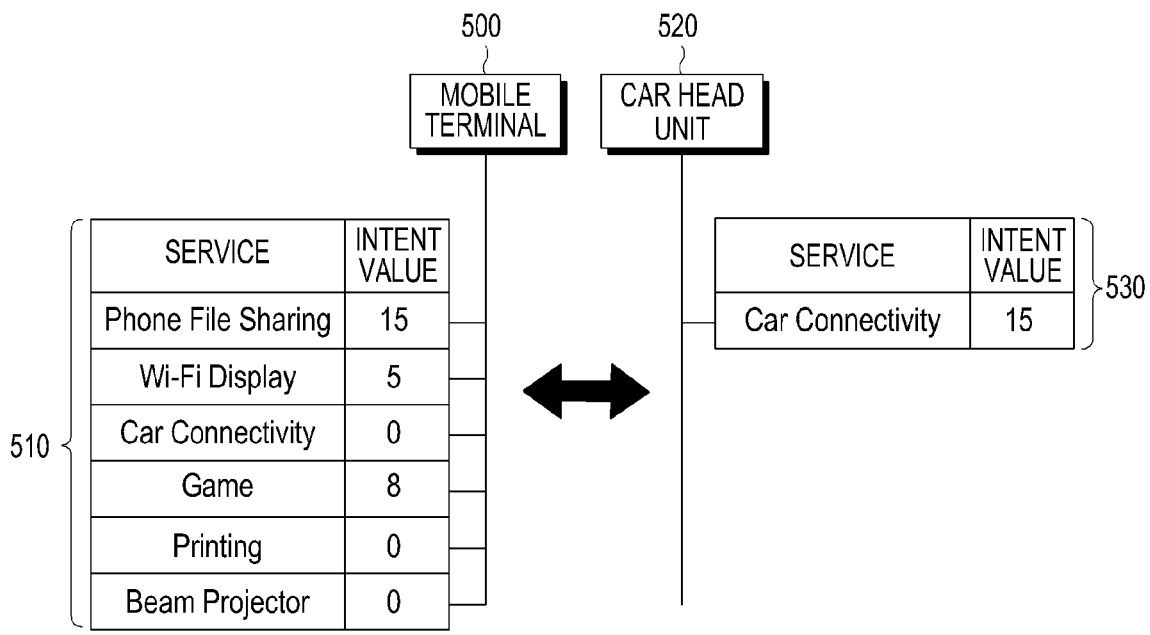
FIG. 5 is a diagram illustrating a table showing intent values with respect to services according to an embodiment of the present invention.

FIG. 5 is a diagram illustrating a table showing intent values with respect to services according to an embodiment of the present invention.

Referring to FIG. 5, a table 510 is stored in the intent value storing unit 240 of a device, such as a mobile terminal 500. For a mobile terminal file sharing service, an intent value may be set to be the maximum value to express a strong intention of having group owner authority. For a Wi-Fi display service and a game service, intent values may be set to be 5 and 8 to express a milder intention when a user may not be concerned with whether their device has group owner authority. For a car connectivity service, a printing service, and a beam projector service, intent values may be set to the minimum value to express intention not to have group owner authority. In the present example, an intent value may range from a minimum value of 0 to a maximum value of 15, and the intent value range may vary as defined in a Wi-Fi Direct Technology.

When a user gets in a car, it may be desirable to designate a car head unit 520 mounted as a group owner at all times, rather than a mobile terminal carried by the user. Therefore, in a table 530 of the car head unit 520, an intent value is set to the maximum value for to the car connectivity service.

Figure 6:
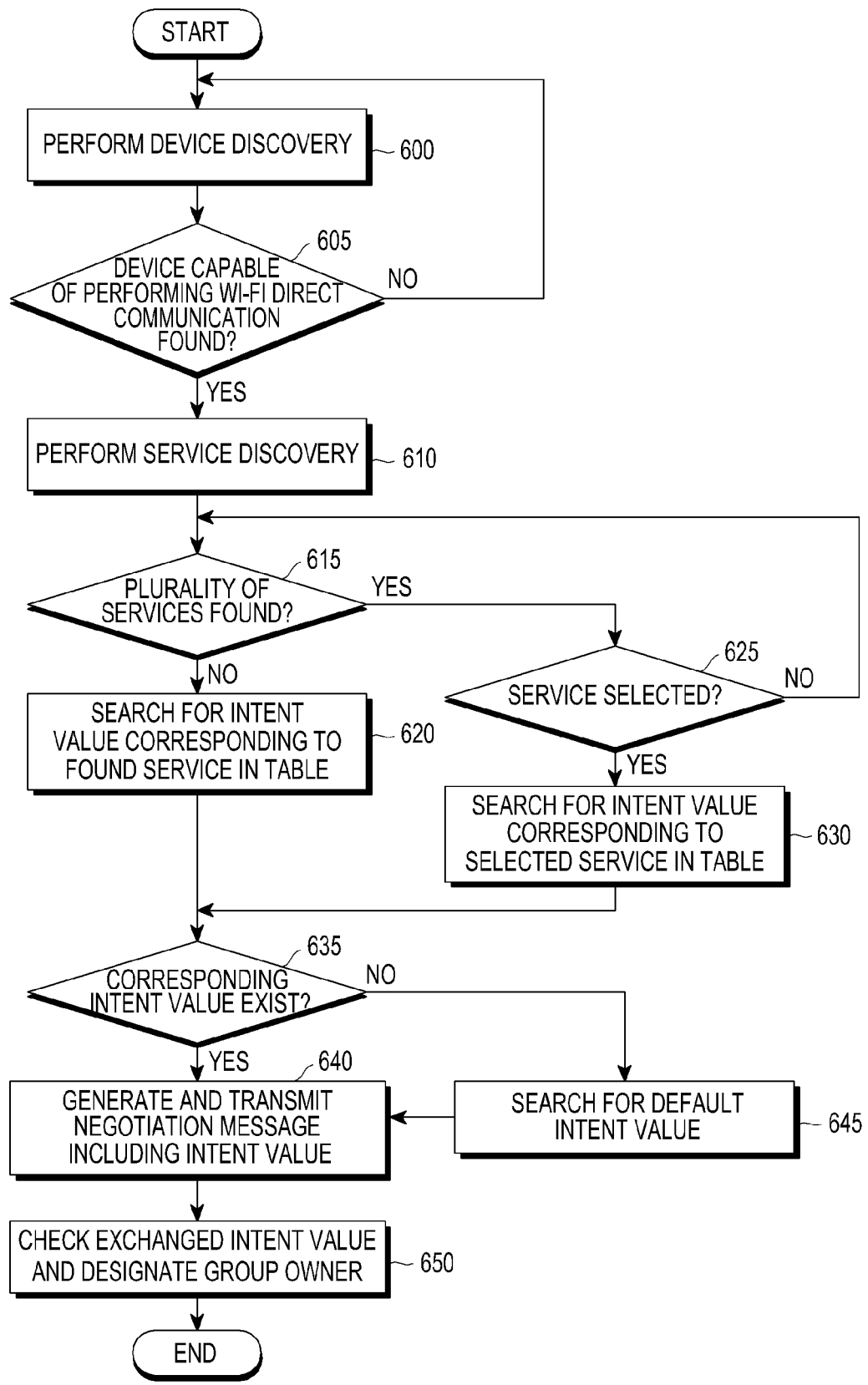
FIG. 6 is a flowchart illustrating operations in a first device shown in FIG. 2 according to an embodiment of the present invention.

FIG. 6 is a flowchart illustrating operations in a first device shown in FIG. 2 according to an embodiment of the present invention.

Referring to FIG. 6, an operating process for designating a group owner in a mobile terminal when Wi-Fi Direct connection is established between the mobile terminal and a car head unit is described. In FIG. 6, it is assumed that a first device is a mobile terminal and a second device is a car head unit, and for a car connectivity service between the two devices, the mobile terminal stores an intent value of 0, in order to indicate an intention for the mobile terminal to operate in a client mode at all times, and the vehicle head unit stores an intent value of 15, in order to indicate an intention for the vehicle head unit to operate as a group owner at all times.

When a driver carrying the mobile terminal gets in the car having the car head unit mounted therein, the mobile terminal performs device discovery, in step 600. Through the device discovery operation, the mobile terminal determines whether a device capable of performing Wi-Fi Direct communication is found, in step 605. If a device capable of performing Wi-Fi Direct communication is found, the mobile terminal performs service discovery, in step 610. In performing the service discovery, the mobile terminal may search for a particular service or search for all services that can be provided by the found device, according to user's setting or manufacturer's presetting. According to such service discovery settings, up to a plurality of services may be found through the service discovery operation. Therefore, in step 615, the mobile terminal determines whether a plurality of services is found.

If only a single service supported in the vehicle head unit is found through the service discovery operation, the mobile terminal searches for an intent value corresponding to the found service in a table in step 620. For example, if the service supported in the vehicle head unit is, for example, a car connectivity service and the car connectivity service is found, the mobile terminal searches for an intent value corresponding to the car connectivity service by referring to the table shown in FIG. 5. The intent value of 0 set for the car connectivity service as shown in FIG. 5 means that the mobile terminal intends to operate as a client.

However, if a plurality of services are found, for example, if all services or a plurality of particular services supported in the vehicle head unit are found, the mobile terminal receives selection of one of them from the user, in step 625. If one of the discovered services is selected, the mobile terminal searches for an intent value corresponding to the selected service in the table shown in FIG. 5, in step 630.

If the corresponding intent value exists in the table in step 635, the mobile terminal generates a negotiation message including the found intent value and transmits the generated negotiation message to the vehicle head unit in step 640. However, if no corresponding intent value is found in the table, in step 635, for example, if the user has not set an intent value corresponding to the car connectivity service, the mobile terminal searches for a default intent value, in step 645. Consequently, if there is no corresponding intent value in the table, the mobile terminal generates a negotiation message including the default intent value and transmits the negotiation message to the vehicle head unit in step 640. Therefore, the mobile terminal and the car head unit can recognize that the intent value of the mobile terminal is 0 and the intent value of the car head unit is 15. In this way, by exchanging negotiation messages, the mobile terminal checks the intent value exchanged with the car head unit and designates the car head unit having the larger intent value as a group owner in step 650. As such, according to embodiments of the present invention, the user of the mobile terminal can determine whether to use the mobile terminal as a group owner according to a type of a service, and thus, can flexibly change the group owner according to a type of a service.

As is apparent from the foregoing description, a Wi-Fi Peer-to-Peer (P2P) device may set different intent values for determining a group owner for various services, thereby determining whether to operate as a group owner according to various types of supportable services. Moreover, according to embodiments of the present invention, different intent values may be set in order to allow more optimized connection establishments according to types of services.

While the invention has been shown and described with reference to certain embodiments thereof, it will be understood by those skilled in the art that various changes in form and details may be made therein without departing from the scope of the invention as defined by the appended claims and their equivalents.

What is claimed is:

1. A method for determining a group owner during establishment of a local-wireless communication connection performed by a first device, the method comprising:
    searching for a second device that supports the local-wireless communication connection;
    searching, after the second device is found, for services supportable by the second device;
    determining an intent value of the first device corresponding to a group owner authority, wherein the determined intent value is a value corresponding to a service to be connected among the found supportable services;
    transmitting, to the second device, a message including the determined intent value of the first device;
    receiving, from the second device, a message including an intent value of the second device; and
    determining a device having the group owner authority by comparing the determined intent value of the first device with the intent value of the second device.

2. The method of claim 1, wherein the local-wireless communication connection is a Wi-Fi Direct connection.

3. The method of claim 1, wherein the determining of the intent value of the first device comprises:
    searching for an intent value corresponding to the service to be connected, by referring to a table in which a respective intent value corresponding to the group owner authority is mapped to each service.

4. The method of claim 3, wherein at least one of each intent value in the table is changeable by a user.

5. The method of claim 3, wherein each of the first device and the second device is at least one of a smart phone, a cellular phone, a digital camera, a Motion Picture Experts' Group Audio Layer-3 (MP3) player, a game console, a television, a display device, a printer, a beam projector, and a car head unit.

6. The method of claim 5, wherein when the first device is a cellular phone and the second device is a car head unit, the service to be connected is a car connectivity service.

7. The method of claim 6, further comprising, when the first device is a cellular phone and the second device is a car head unit, storing, by the first device, an intent value, which is set to a minimum value, corresponding to the car connectivity service, such that the second device is designated as the group owner.

8. The method of claim 1, wherein the device having the authority of the group owner is, from among the first device and the second device, a device having a larger intent value corresponding to the service to be connected.

9. A first device for determining a group owner during establishment of a local-wireless communication connection, the first device comprising:
    a local-wireless communication connecting unit for searching for a second device that supports the local-wireless communication connection and searching for services supportable by the second device, after the second device is found; and
    a controller for determining an intent value of the first device corresponding to a group owner authority, wherein the determined intent value is a value corresponding to a service to be connected among the found supportable services, transmitting, to the second device, a message including the determined intent value of the first device, and receiving, from the second device, a message including an intent value of the second device, and determining a device having the group owner authority by comparing the determined intent value of the first device with the intent value of the second device.

10. The first device of claim 9, wherein the local-wireless communication connection is a Wi-Fi Direct connection.

11. The first device of claim 9, further comprising a storing unit for storing a table in which a respective intent value corresponding to the group owner authority is mapped to each service.

12. The first device of claim 11, wherein the controller searches for an intent value corresponding to the service to be connected, by referring to the table.

13. The first device of claim 11, wherein at least one of each respective intent value regarding the group owner authority for each service in the table is changeable by a user.

14. The first device of claim 9, wherein each of the first device and the second device is at least one of a smart phone, a cellular phone, a digital camera, a Motion Picture Experts' Group Audio Layer-3 (MP3) player, a game console, a television, a display device, a printer, a beam projector, and a car head unit.

15. The first device of claim 14, wherein when the first device is a cellular phone and the second device is a car head unit, the service to be connected is a car connectivity service.

16. The first device of claim 15, wherein the storing unit stores an intent value, which is set to a minimum value, corresponding to the car connectivity service such that the second device is designated as the group owner, when the first device is a cellular phone and the second device is a car head unit.

17. The first device of claim 9, wherein the device having the group owner authority is, from among the first and second devices, a device having a larger intent value corresponding to the service to be connected.

* * * * *